US009863669B2

(12) United States Patent
Ueda et al.

(10) Patent No.: US 9,863,669 B2
(45) Date of Patent: Jan. 9, 2018

(54) BRAYTON CYCLE TYPE REFRIGERATING APPARATUS

(71) Applicant: MAYEKAWA MFG. CO., LTD., Tokyo (JP)

(72) Inventors: Shota Ueda, Tokyo (JP); Akito Machida, Tokyo (JP); Mizuo Kudo, Tokyo (JP); Naoko Nakamura, Tokyo (JP)

(73) Assignee: MAYEKAWA MFG. CO., LTD., Tokyo (JP)

(*) Notice: Subject to any disclaimer, the term of this patent is extended or adjusted under 35 U.S.C. 154(b) by 253 days.

(21) Appl. No.: 14/773,798

(22) PCT Filed: Mar. 20, 2014

(86) PCT No.: PCT/JP2014/057679
§ 371 (c)(1),
(2) Date: Sep. 9, 2015

(87) PCT Pub. No.: WO2014/192382
PCT Pub. Date: Dec. 4, 2014

(65) Prior Publication Data
US 2016/0018134 A1 Jan. 21, 2016

(30) Foreign Application Priority Data
May 31, 2013 (JP) .................. 2013-116116

(51) Int. Cl.
*F25B 1/10* (2006.01)
*F25B 7/00* (2006.01)
(Continued)

(52) U.S. Cl.
CPC .................. *F25B 7/00* (2013.01); *F02C 1/10* (2013.01); *F25B 1/10* (2013.01); *F25B 11/02* (2013.01);
(Continued)

(58) Field of Classification Search
CPC .... F25B 1/10; F25B 40/00; F25B 7/00; F25B 45/00; F25B 11/02; F25B 2500/24;
(Continued)

(56) References Cited

U.S. PATENT DOCUMENTS 4,175,397 A 11/1979 Edwards et al.
4,185,469 A 1/1980 Rogers et al.
(Continued)

FOREIGN PATENT DOCUMENTS

CN 1789862 A 6/2006
CN 101861500 A 10/2010
(Continued)

OTHER PUBLICATIONS

International Search Report issued in PCT/JP2014/057679, dated Jun. 24, 2014. English translation provided.
(Continued)

*Primary Examiner* — Len Tran
*Assistant Examiner* — Ana Vazquez
(74) *Attorney, Agent, or Firm* — Rossi, Kimms & McDowell LLP (57) ABSTRACT

A Brayton cycle type refrigerating apparatus using multiple stages of compressors and having a good response without reduction in efficiency due to change in heat load of the object to be cooled is provided. The Brayton cycle type refrigerating apparatus includes on a refrigerant line on which multiple stages of compressors are arranged in series. The apparatus also includes a temperature sensor for detecting heat load of an object to be cooled and a buffer tank provided between a low pressure line and a high pressure line. A flow rate of the refrigerant in the refrigerant line is controlled by controlling opening degrees of valves to adjust the cooling capacity.

5 Claims, 6 Drawing Sheets

(51) Int. Cl.

| | | |
|---|---|---|
| *F02C 1/10* | (2006.01) | |
| *F25B 11/02* | (2006.01) | |
| *F25B 40/00* | (2006.01) | |
| *F25B 41/04* | (2006.01) | |
| *F25B 45/00* | (2006.01) | |

(52) U.S. Cl.
CPC ............ *F25B 40/00* (2013.01); *F25B 41/043* (2013.01); *F25B 45/00* (2013.01); *F25B 2345/006* (2013.01); *F25B 2500/23* (2013.01); *F25B 2500/24* (2013.01); *F25B 2600/2523* (2013.01); *F25B 2700/1933* (2013.01); *F25B 2700/21163* (2013.01); *F25B 2700/21172* (2013.01)

(58) Field of Classification Search
CPC ........ F25B 2500/23; F25B 2700/21172; F25B 2700/21163; F25B 41/043
See application file for complete search history.

(56) References Cited

U.S. PATENT DOCUMENTS

| | | | |
|---|---|---|---|
| 4,246,759 A | | 1/1981 | Signoret |
| 4,283,924 A | | 8/1981 | Schutze |
| 5,524,442 A | * | 6/1996 | Bergman, Jr. .......... F25B 9/004 62/401 |
| 6,209,338 B1 | * | 4/2001 | Thatcher, Jr. .......... F25B 45/00 62/149 |
| 2006/0266054 A1 | | 11/2006 | Steinbach |
| 2010/0275616 A1 | | 11/2010 | Saji et al. |
| 2012/0055664 A1 | | 3/2012 | Bornard et al. |
| 2013/0008190 A1 | | 1/2013 | Longsworth |
| 2013/0081411 A1 | | 4/2013 | Xu |

FOREIGN PATENT DOCUMENTS

| | | |
|---|---|---|
| CN | 103033000 A | 4/2013 |
| EP | 2211124 A1 | 7/2010 |
| GB | 487026 A | 6/1938 |
| JP | 04-020754 A | 1/1992 |
| JP | 05272357 A | 10/1993 |
| JP | 09329034 A | 12/1997 |
| JP | 2873388 B2 | 3/1999 |
| JP | 2003148824 A | 5/2003 |
| JP | 2011106755 A | 6/2011 |
| JP | 2012251667 A | 12/2012 |
| RU | 2295097 C1 | 3/2007 |
| WO | 2013006299 A1 | 1/2013 |

OTHER PUBLICATIONS

Office Action issued in Korean Appln. No. 10-2015-7022659, dated Nov. 18, 2016.
Extended European Search Report issued in European Application No. 14804125.4 dated May 13, 2016.
Extended European Search Report issued in European Patent Application No. 16197194.0 dated Feb. 6, 2017.
Dean et al., "Liquid helium refrigerator control", Cryogenics, Elsevier, Kidlington, GB, vol. 25, No. 2, Feb. 1, 1985, pp. 87-91, XP024049647. Cited in NPL 1.
Office Action issued in Russian Patent Application No. 2015150778 dated Feb. 3, 2017. English translation provided.
International Preliminary Report on Patentability issued in PCT/JP2014/057679, dated Dec. 1, 2015. English translation provided.
Office Action issued in Chinese Application No. 201480031067.X dated Sep. 5, 2016.

* cited by examiner

BRAYTON CYCLE TYPE REFRIGERATING APPARATUS

TECHNICAL FIELD

The present invention relates to a Brayton cycle type refrigerating apparatus which is capable of controlling the cooling capacity against a change in heat load of the object to be cooled.

A Brayton cycle used for a refrigerating apparatus is called "reverse Brayton cycle" in contrast with Brayton cycle used as a thermal engine. However, in this description, such Brayton cycle used for a refrigerating apparatus will be referred to simply as "Brayton cycle" (see "Handbook of Superconductivity and Cryogenic Engineering", 1993, Ohmsha, edited by Cryogenic Association of Japan).

BACKGROUND

As a type of refrigeration cycles using a rotating machine such as a compressor or an expander, a refrigerating apparatus using the Brayton cycle is known. Examples of such a type of refrigeration system include a refrigeration system having a plurality of compressors or expansion turbines arranged in series on a circulation path in which the refrigerant flows to compress or expand the refrigerant in multiple stages thereby to improve the cooling capacity, as disclosed in Patent Document 1 or Patent Document 2.

CITATION LIST

Patent Literature

Patent Document 1: JP 2003-148824 A
Patent Document 2: JP Hei9-329034 A

SUMMARY

Technical Problem

In a refrigerating apparatus of such a type, when the heat load of the object to be cooled is changed, the rotational speed of the compressor or the expander is controlled to adjust the refrigeration capacity in accordance with the heat load. However, in the case where the refrigerating capacity is controlled by the rotational speed control, other control parameters such as the flow rate of the refrigerant, pressure ratio and temperature may also be changed with the change of the rotational speed. Accordingly, there is a problem such that it may take a long time until the refrigeration capacity converge to a prescribed target value depending on the heat load, and thus it is difficult to obtain a good response.

Particularly in the case of using multiple stages of rotating machines as described in the above Patent Documents, if one tries to control the rotational speeds of respective compressors, the number of the control parameters which changes in accordance with the rotational speeds will be increased, and thus the above problems may become more significant.

In the case of adjusting the refrigeration capacity by rotational speed control, there is also a problem such that the coefficient of performance (COP) of the refrigerator will be declined due to reduction the adiabatic efficiency of the expander. In an evaluation by the present inventors, they have found that when the rotational speed is changed by about 10%, COP is reduced by about 30%.

The present invention has been made in view of the above problem and to provide a Brayton cycle type refrigerating apparatus using multiple stages of compressors and having a good response without reduction in efficiency due to change in heat load of the object to be cooled.

Solution to Problem

In order to solve the above problem, a Brayton cycle type refrigerating apparatus according to the present invention utilizes a Brayton cycle having multiple stages of compressors arranged in series on a refrigerant line for generating cool heat by using a refrigerant compressed by the compressors to cool a secondary refrigerant, and comprises:

a heat load detecting device for detecting a heat load of an object to be cooled;

a buffer tank provided between a low pressure line in which the refrigerant before being compressed by the compressors flows and a high pressure line in which the refrigerant after being compressed by the compressors flows;

a first valve provided on an inlet side of the buffer tank and capable of controlling an inflow rate of the refrigerant into the buffer tank;

a second valve provided on an outlet side of the buffer tank and capable of controlling an outflow rate of the refrigerant from the buffer tank; and a control device for controlling an opening degree of the first valve and an opening degree of the second valve, wherein the control device is configured, when a change in the heat load of the object to be cooled is detected by the heat load detecting device, to adjust the opening degree of the first valve and the opening degree of the second valve to change a flow rate of the refrigerant flowing in the Brayton cycle.

According to the present invention, when a change in the heat load of the object to be cooled is detected, by adjusting the openings of the first valve and the second valve to control the flow rate of the refrigerant flowing in the Brayton cycle, it is possible to adjust the refrigeration capacity. In such a control of flow rate of the refrigerant, the mass flow rate is changed while the volume flow rate is kept constant, whereby a good response to the heat load change may be obtained without changing other control parameters such as pressure ratio or temperature. In the flow rate control of the refrigerant, reduction in the adiabatic efficiency of the expander, which may be caused in the conventional rotational speed control, may be avoided, whereby it is possible to avoid decline in the coefficient of performance.

Further, as the buffer tank is provided between the low pressure line and the high pressure line where a pressure difference exists, by opening or closing the first valve provided on the high pressure line, it is possible to introduce the refrigerant into the buffer tank according to the pressure difference between the buffer tank and the high pressure line. On the other hand, by opening or closing the second valve provided on the low pressure line, it is possible to discharge the refrigerant from the buffer tank according to the pressure difference between the buffer tank and the low pressure line. Accordingly, through the flow rate control using a buffer tank, which does not require power supply from outside, excellent energy efficiency can be obtained.

In an embodiment of the present invention, the high pressure line may be a line to which the refrigerant is discharged from a compressor disposed at the lowermost stream position among the compressors, and the low pressure line may be a line through which the refrigerant is supplied to a compressor disposed at the uppermost stream position among the compressors.

According to this embodiment, as a large pressure difference between the high pressure line and the low pressure line can be ensured, by opening/closing control of the first valve and the second valve, it is possible to easily carry out the flow rate control through introduction or discharge of the refrigerant from the buffer tank.

In the above embodiment, the Brayton cycle type refrigerating apparatus may further comprise a cool heat recovering heat exchanger for exchanging heat between the refrigerant compressed by the compressors and the refrigerant after cooling the object to be cooled, and the high pressure line may have a branching line branched from a position between the at least one of the compressors and the cold heat recovering heat exchanger.

According to such an embodiment, by using cold heat remaining in the refrigerant after cooling the object to be cooled by the cold heat recovering heat exchanger, it is possible to precool the refrigerant having a high temperature to be supplied to the expander to improve the refrigerating capacity. In the case where the refrigerant is introduced into the buffer tank to carry out the flow rate control, by introducing the refrigerant into the buffer tank from a branch from the upper stream side of the cold heat recovering heat exchanger, the flow rate of the refrigerant supplied to the cold heat recovering heat exchanger is decreased, whereby it is possible to cool the refrigerant by the cold heat recovering heat exchanger more effectively.

In another embodiment, the control device may be configured, when the change rate of the heat load detected by the heat load detecting device is greater than a preliminarily set prescribed value, to control a rotational speed of at least one of the compressors and a rotational speed of an expander, and then to adjust the opening degree of the first valve and the opening degree of the second valve.

According to the above embodiment, in a case where a rapid change in heat load of the object to be cooled arises, the rotational speed of the compressor and the expander is controlled prior to the flow rate control of the refrigerant by adjustment of opening degrees of the valves, whereby a good response to a large change in the heat load can be obtained.

In another embodiment, a cooling part of the Brayton cycle may be configured to cool, by means of a heat exchanger, a secondary refrigerant circulating through the object to be cooled, and the heat load detecting device may comprise a temperature sensor provided on a line in which the secondary refrigerant flows.

According to the above embodiment, the heat load detecting device for detecting a heat load of the object to be cooled comprises a temperature sensor provided on a line in which the secondary refrigerant flows, whereby it is possible to rapidly detect a change in the heat load of the object to be cooled, thereby to obtain a Brayton cycle refrigerating apparatus excellent in responsiveness.

In another embodiment, the multiple stages of compressors may comprise a first compressor, a second compressor and a third compressor, arranged in series in this order from the upstream side; the first compressor and the second compressor may be connected to an output shaft of a first electric motor; and the third compressor and the expander may be connected to an output shaft of a second electric motor.

According to the above embodiment, the first to the third compressors are arranged in series in the circulation path to enable compression in multiple stages. In particular, the first compressor and the second compressor are connected to the output shaft of the first electric motor, whereby it is possible to simplify the structure as compared with the case where a power source is provided for each compressor. Further, the third compressor and the expander are connected to the output shaft of the second electric motor, whereby it is possible to simplify the structure, and in addition, the power recovered by the expander contributes to the compression power of the third compressor to improve efficiency.

Advantageous Effects

According to the present invention, when a change in the heat load of the object to be cooled is detected, by adjusting the openings of the first valve and the second valve to control the flow rate of the refrigerant flowing in the Brayton cycle, it is possible to adjust the refrigeration capacity. In such a control of flow rate of the refrigerant, the mass flow rate is changed while the volume flow rate is kept constant, whereby a good response to the heat load change may be obtained without changing other control parameters such as pressure ratio or temperature. In the flow rate control of the refrigerant, reduction in the adiabatic efficiency of the expander, which may be caused in the conventional rotational speed control, may be avoided, whereby it is possible to avoid decline in the coefficient of performance.

Further, as the buffer tank is provided between the low pressure line and the high pressure line where a pressure difference exists, by opening or closing the first valve provided on the high pressure line, it is possible to introduce the refrigerant into the buffer tank according to the pressure difference between the buffer tank and the high pressure line. On the other hand, by opening or closing the second valve provided on the low pressure line, it is possible to discharge the refrigerant from the buffer tank according to the pressure difference between the buffer tank and the low pressure line. Accordingly, through the flow rate control using a buffer tank, which does not require power supply from outside, excellent energy efficiency can be obtained.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
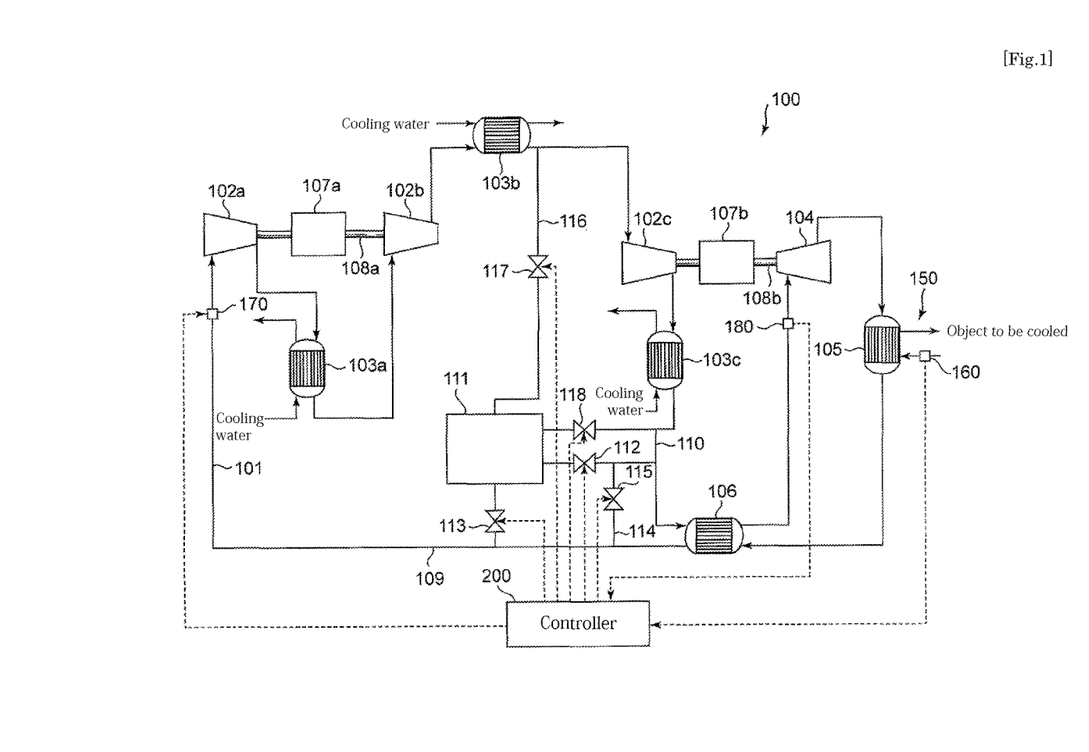
FIG. 1 is a diagram schematically illustrating the whole construction of a Brayton cycle type refrigerating apparatus (hereinafter also referred to as "refrigerating apparatus") of an example of the present invention.
Figure 2A:
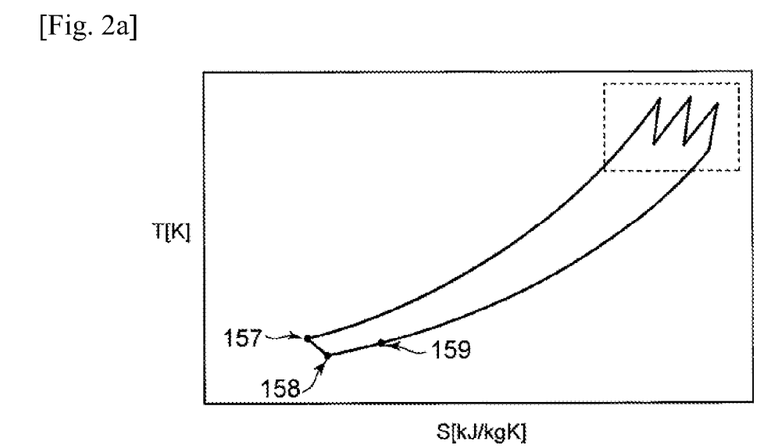
FIGS. 2a and 2b is a T-S diagram of a Brayton cycle of the refrigerating apparatus.
Figure 2B:
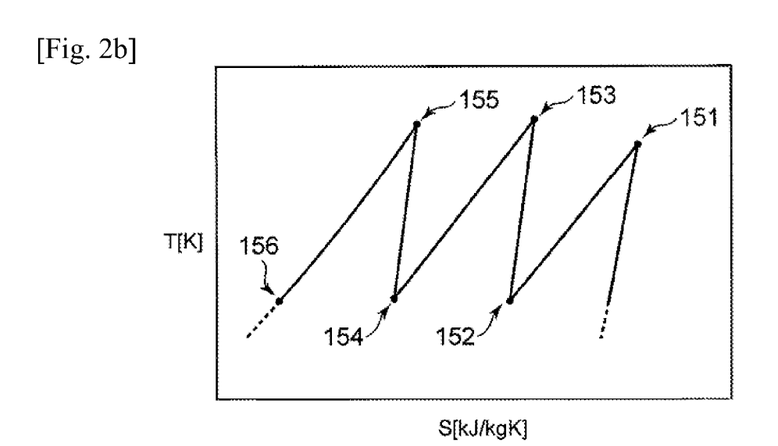

FIG. 1 is a diagram schematically illustrating the whole construction of a Brayton cycle type refrigerating apparatus (hereinafter also referred to as "refrigerating apparatus") 100 of an example of the present invention. FIGS. 2a and 2b is a T-S diagram of a Brayton cycle of the refrigerating apparatus 100, where the vertical axis shows tempretures T [K] and the horizontal one entropies S [KJ/kgK]. FIG. 2b is an enlarged view of the area enclosed by the dashed line in FIG. 2a.

The refrigerating apparatus 100 comprises, on a circulation path 101 in which a refrigerant flows, a compressor 102 for compressing the refrigerant, a heat exchanger 103 for cooling the refrigerant compressed by the compressor by heat exchange with cooling water, an expander 104 for expanding the refrigerant, a cooling part 105 having a heat exchanger for heat exchange between the refrigerant and an object to be cooled, and a cold heat recovering heat exchanger 106 for recovering a cold heat of the refrigerant, which are provided in order on the circulation path to form a Brayton cycle of a countercurrent flow heat exchanger type using a refrigeration cycle of a steady circulation flow.

The object to be cooled by the refrigerating apparatus 100 is a superconducting device (not shown) using a superconductor under a very low temperature condition. On the superconducting device side as the object to be cooled, liquid nitrogen is used as a secondary refrigerant to be subjected to heat exchange in the cooling part 105 with the refrigerant used in the refrigerating apparatus 100 (in FIG. 1, only the circulation path 150 in which the liquid nitrogen, which is the refrigerant in the object to be cooled, circulates is shown). The liquid nitrogen flowing in the circulation path 150 and having a temperature increased by the heat load of the superconducting device is thereby cooled by heat exchange with the refrigerant flowing in the circulation path 101 cooled by the refrigerating apparatus 100.

On the circulation path 150 in which the secondary refrigerant flows, a temperature sensor 160 as a heat load detecting device for detecting a heat load of the object to be cooled is provided.

As the refrigerant in the circulation path 101 on the refrigerating apparatus 100 side, a type of gas may be suitably selected depending on e.g. cooling temperature, and for example, helium, neon, hydrogen, nitrogen, air, or a hydrocarbon may be employed.

The refrigerating apparatus 100 has, on the circulation path 101, a plurality of compressors 102a, 102b, 102c and heat exchangers 103a, 103b, 103c. The heat exchangers 103a, 103b, 103c are provided on a downstream side of the compressors 102a, 102b, 102c, respectively, and are configured to cool, by heat exchange with cooling water, the refrigerant having a temperature increased by adiabatic compression.

The temperature of the refrigerant flowing in the circulation path 101 is increased by adiabatic compression firstly by the compressor 102a provided on the uppermost stream position (see the portion 151 in FIG. 2b), and then the refrigerant is cooled by heat exchange with the cooling water in the heat exchanger 103a provided on the downstream side (see the portion 152 in FIG. 2b). Thereafter the temperature of the refrigerant is again increased by adiabatic compression by the compressor 102b (see the portion 153 in FIG. 2b), and then the refrigerant is cooled by heat exchange with the cooling water in the heat exchanger 103b provided on the downstream side (see the portion 154 in FIG. 2b). Further, the temperature of the refrigerant is again increased by adiabatic compression by the compressor 102c (see the portion 155 in FIG. 2b), and then the refrigerant is cooled by heat exchange with the cooling water in the heat exchanger 103c provided on the downstream side (see the portion 156 in FIG. 2b).

In the refrigerating apparatus 100, multiple stages of adiabatic compression by the compressors 102 and cooling by the heat exchangers 103 are repeatedly carried out to improve the efficiency. That is, by carrying out multiple stages of repetition of adiabatic compression and cooling, the compression process of the Brayton cycle is brought closer to the ideal isothermal compression. More number of stages will make the compression process closer to the isothermal compression; however, the number of stages may be decided in view of the selection of the compression ratio due to increase in the stages, the complication of the apparatus configuration and simplicity of the operation.

The refrigerant flown through the heat exchanger 103c is furthermore cooled by the cold heat recovering heat exchanger 106 (see the portion 157 in FIG. 2a), and is subjected to adiabatic expansion by the expander 104 to generate a cold heat (see the portion 158 in FIG. 2a).

In FIG. 1, an example of the refrigerating apparatus 100 having a single expander 104 is shown; however, the refrigerating apparatus 100 may have a plurality of expander arranged in series on the circulation path in the same way as the compressors 102.

The refrigerant exhausted from the expander 104 is subjected to heat exchange in the cooling part 105 with the liquid nitrogen flowing in the circulation path within the superconducting device as the object to be cooled to have a temperature increased by the heat load (see the portion 159 in FIG. 2a).

The refrigerant having a temperature increased by the cooling part 105 is introduced into the cold heat recovering heat exchanger 106, and is subjected to heat exchange with the compressed refrigerant having a high temperature flown through the heat exchanger 103c to recover the remaining cold heat. By using the cold heat remaining in the refrigerant after cooling the object to be cooled, the temperature of the refrigerant to be introduced into the expansion turbine can be decreased, whereby the cooling efficiency can be improved.

As described above, in the refrigerating apparatus 100, a Brayton cycle is formed by using a plurality of rotating machines including the compressors 102 and the expander 104.

The two compressors 102a, 102b at the upper stream side are connected to the both ends of the output shaft 108a of the electric motor 107a as their common power source, respectively, whereby the number of parts can be reduced, and the refrigerating apparatus can be installed in a small space. Also, the compressor 102c at the lower stream side and the expander 104 are connected to the both ends of the output shaft 108b of the electric motor 107b as their common power source, respectively, whereby the number of parts can be reduced, and the refrigerating apparatus can be installed in a small space. In addition, the power generated by the expander 104 contributes to the compressing power of the compressor 102c, whereby the efficiency is improved.

Figure 3:
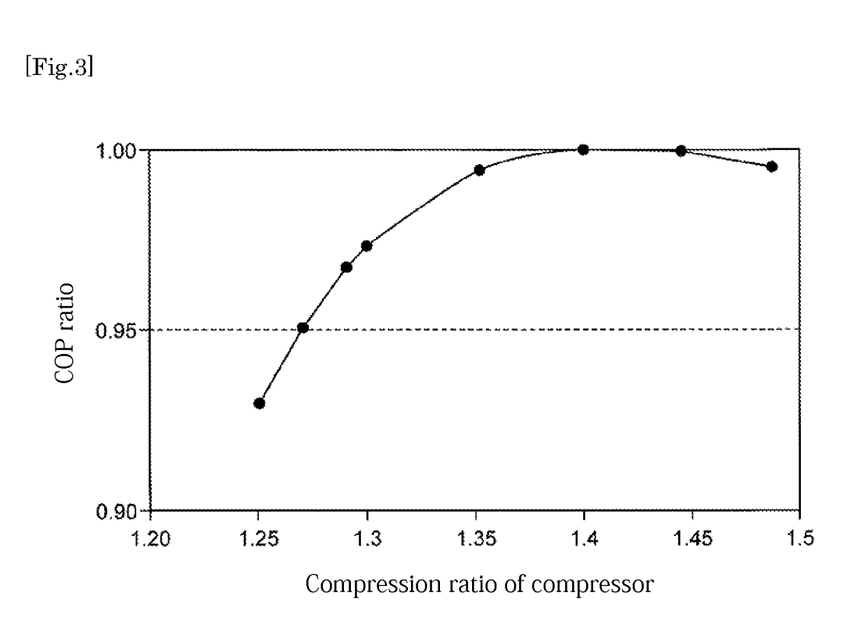
FIG. 3 is a graph showing the relationship between compression ratios and ratios of coefficient of performance of the compressor of the refrigerating apparatus of the example.

FIG. 3 is a graph showing the relationship between compression ratios and ratios of coefficient of performance (COP ratios) of the compressors 102 of the refrigerating apparatus 100 of the example. According to this graph, it is analytically shown that when the compression ratio of the compressor 102 is about 1.40, COP becomes maximum. According to a research by the present inventors, it has been found that in order to obtain a compression ratio of about 1.40, it is best to set the number of stages of the compressors to '3' and to set the number of stages of the expanders to '1'.

Again in FIG. 1, in the circulation path 101 as a refrigerant line constituting the Brayton cycle, between the low pressure line 109 in which in which the refrigerant before being compressed by the compressors 102 flows and the high pressure line 110 in which the refrigerant after being compressed by the compressors 102 flows, a buffer tank 111 is provided. On the inlet side (the high pressure line 110 side) of the buffer tank 111, provided is a first valve 112 capable of controlling an inflow rate of the refrigerant into the buffer tank 111, and on the outlet side (the low pressure line 109 side) of the buffer tank 111, provided is a second valve 113 capable of controlling an outflow rate of the refrigerant from the buffer tank 111.

The first valve 112 and the second valve 113 are electric-operated valves of which opening degrees are adjustable on the basis of control signals from a controller 200 as an example of the control device according to the present invention, and are configured to permit inflow and outflow of the refrigerant between the circulation path 101 and the buffer tank 111 constituting the Brayton cycle.

The controller 200 is a control unit to integrally control the operation of the refrigerating apparatus 100, and it is configured to control respective components of the refrigerating apparatus 100 on the basis of detection values by the above temperature sensor 160 to adjust the refrigeration capacity according to the change in the heat load of the object to be cooled.

Particularly in this example, the temperature sensor 160 is provided on the circulation path 150 in which the secondary refrigerant flows, whereby it is possible to rapidly detect a change in the heat load of the object to be cooled. Accordingly, a Brayton cycle type refrigerating apparatus having a good responsiveness can be obtained.

Further, in the vicinity of the compressor 102a disposed on the uppermost stream side, provided is a pressure sensor 170 for detecting a pressure of the refrigerant before being compressed by the respective compressors 102. The detected value by the pressure sensor 170 corresponds to the flow rate of the refrigerant flowing in the circulation path 101, and is sent to the controller 200 to be used for control of various components, as is the case with the detected value by the temperature sensor 160.

Figure 4:
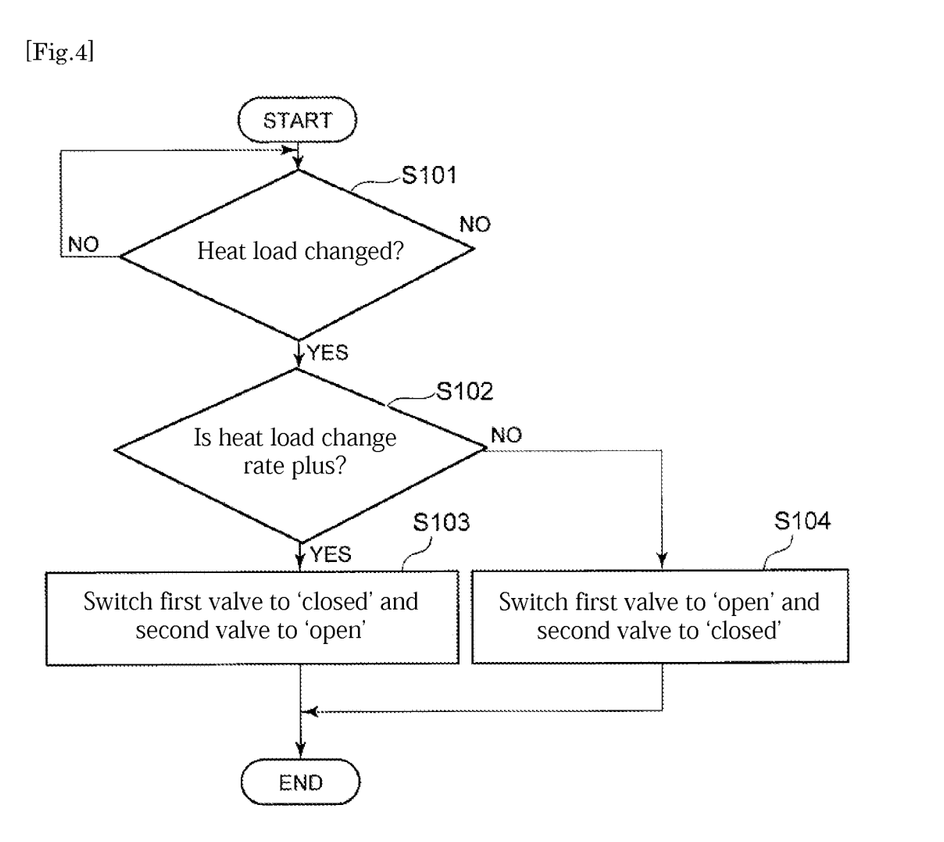
FIG. 4 is a flowchart showing control flow by the controller at the time of change in heat load.

Now, the control flow by the controller 200 in the refrigerating apparatus 100 will be described with reference to FIG. 4. FIG. 4 is a flowchart showing the control flow by the controller 200 at the time of change in the heat load.

First, the controller 200 determines whether there is a change in heat load of the object to be cooled or not on the basis of the detected value by the temperature sensor 160 (step S101). In the case where it is determined that there is a change in the heat load (YES in step S101), the controller 200 calculates the rate of change in the heat load and determines whether the change is plus or minus (step S102). In the case where it is determined that there is not a change in the heat load (NO in step S101), the flow returns to the step S101 to repeat the step.

In the case where the rate of change in the heat load is plus (YES in step S102), that is, in the case where the heat load have increased, the controller 200 carries out the control so as to open the second valve 113 while the first valve 112 is closed (step S103). Then, the refrigerant stored in the buffer tank 111 is discharged into the low pressure line 109 by the pressure difference between the buffer tank 111 and the low pressure line 109 to increase the flow rate (pressure) of the refrigerant flowing in the Brayton cycle. As a result, the cooling capacity of the refrigerating apparatus 100 is adjusted to increase in accordance with the increase in the heat load of the object to be cooled.

On the other hand, in the case where the rate of change in the heat load is minus (NO in step S102), that is, in the case where the heat load have decreased, the controller 200 carries out the control so as to open the first valve 112 while the second valve 113 is closed (step S104). Then, the a part of the refrigerant flowing in the high pressure line 110 is introduced into the buffer tank 111 by the pressure difference between the high pressure line 110 and the buffer tank 111, to decrease the flow rate (pressure) of the refrigerant flowing in the circulation path 101. As a result, the cooling capacity of the refrigerating apparatus 100 is adjusted to decrease in accordance with the decrease in the heat load of the object to be cooled.

Since the opening degrees of the first valve 112 and the second valve 113 are required to be adjusted at the time of the above flow control, electric-operated valves may preferably be used as the first valve 112 and the second valve 113.

The control of the opening degrees of the first valve 112 and the second valve 113 by the controller 200 may preferably be carried out so that the flow rate of the refrigerant flowing in the circulation path 101 becomes the target flow rate corresponding to the rate of change of the heat load detected by the temperature sensor 160, for example. In regard to the target flow rate, a map of a relationship between the opening degree of each of the valves corresponding to the target flow rate and the rate of change of the detected value of the temperature sensor 160 may be preliminary stored in a storing device such as a memory, and an actual measurement value may be compared according to the map to carry out the control of the opening degrees of the valves.

Figure 5:
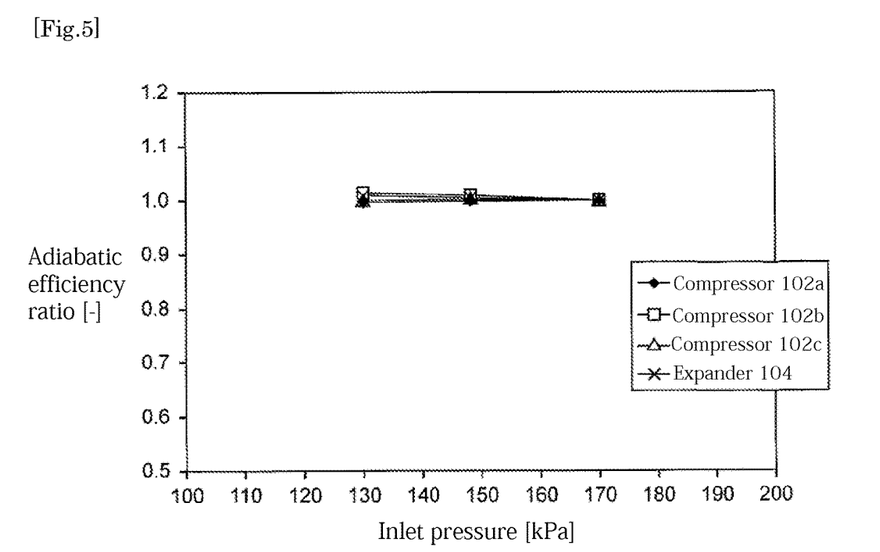
FIG. 5 is a graph showing relationship between detected values by a pressure sensor and adiabatic efficiency ratio of each of the compressors and the expander of the refrigerating apparatus of the example.
Figure 6:
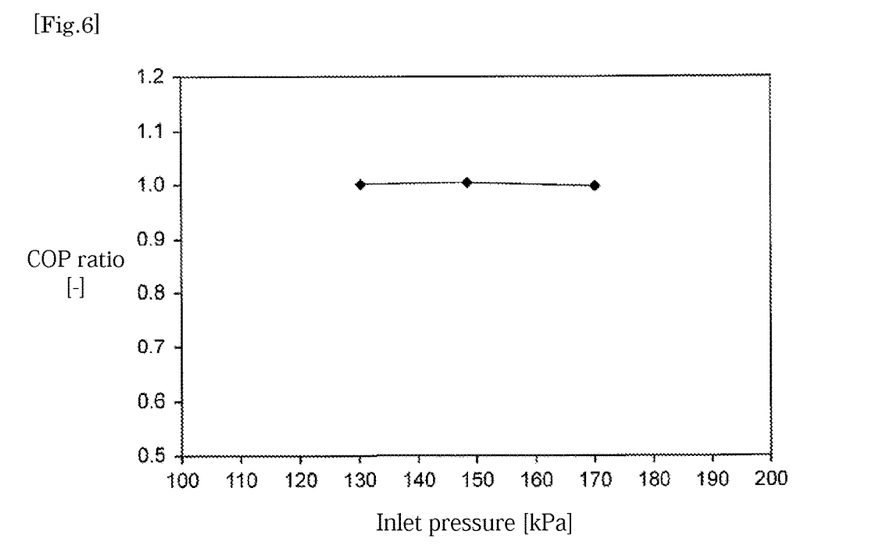
FIG. 6 is a graph showing relationship between detected values by the pressure sensor and coefficient of performance of the refrigerating apparatus of the example.

FIG. 5 is a graph showing relationship between detected values by a pressure sensor 170 and adiabatic efficiency ratio of each of the compressors 102 of the refrigerating apparatus 100 of the example. FIG. 6 is graph showing relationship between detected values by the pressure sensor 170 and coefficient of performance (COP) of the refrigerating apparatus of the example. In FIG. 5 and FIG. 6, results obtained by calculating adiabatic efficiency ratios and COPs on the basis of a reference value of 170 kPa of the detected value by the pressure sensor 170 are shown. As shown in these graphs, a result was obtained such that with the refrigerating apparatus 100 of this example, even in a case where the pressure of the refrigerant before being compressed by the respective compressors 102 is changed, the adiabatic efficiency ratio and the coefficient of performance (COP) are substantially kept constant without change.

Figure 7:
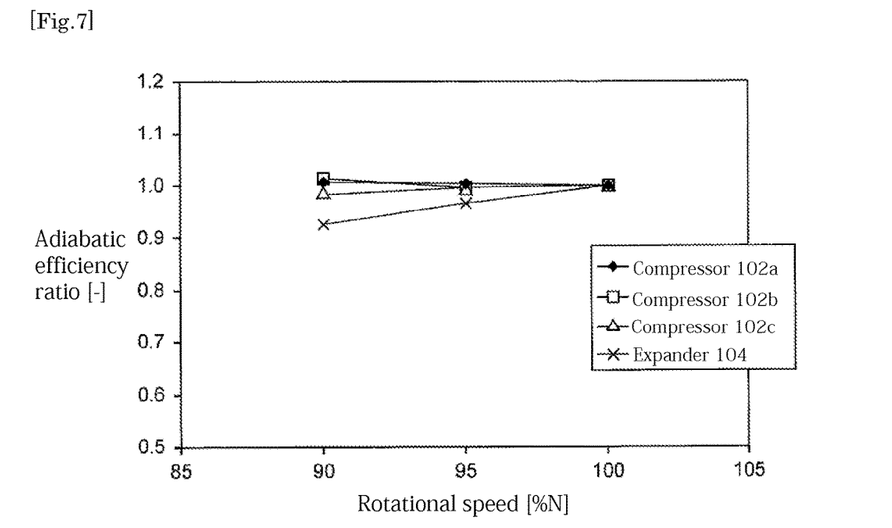
FIG. 7 is a graph showing relationship between detected values by the pressure sensor and adiabatic efficiency ratio of each compressor and the expander of a refrigerating apparatus of a comparative example.
Figure 8:
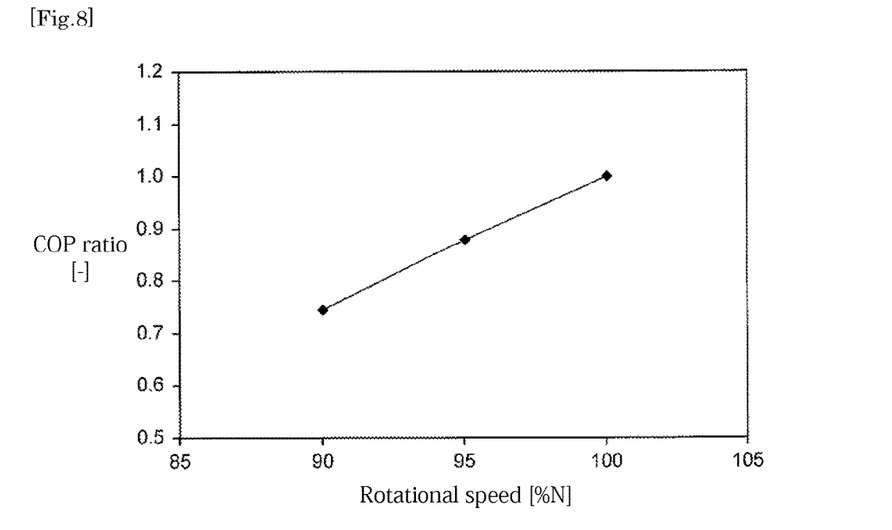
FIG. 8 is a graph showing relationship between detected values by the pressure sensor and coefficient of performance of the refrigerating apparatus of a comparative example.

On the other hand, FIG. 7 and FIG. 8 are graphs showing a relationship between the rotational speed and the adiabatic efficiency ratio and a relationship between the rotational speed and the coefficient of performance (COP), respectively, in a case where the refrigeration capacity is adjusted only by rotational speed control of the compressors 102 and the expander 104 in a conventional way. That is, FIG. 7 and FIG. 8 show a comparative example in the case of conventional rotational speed control. In FIG. 7 and FIG. 8, results obtained by calculating adiabatic efficiency ratios and COPs on the basis of a reference value of 100% of the rotational speed are shown.

In this case, as shown in FIG. 7, the adiabatic efficiency ratios of the rotating machines are reduced in accordance with the change in the rotational speed, and it is shown that such tendency is particularly significant with the case of expander 104. Further, the expansion ratio is also reduced in accordance with the change in the rotational speed. As a result, as shown in FIG. 8, COP is reduced and the refrigeration capacity of the refrigerating apparatus is declined.

Accordingly, with the refrigerating apparatus 100 of this example, when a change in the heat load of the object to be cooled is detected, by adjusting the openings of the first valve 112 and the second valve 113, the flow rate of the refrigerant flowing in the circulation path 101 is controlled to adjust the refrigeration capacity. In such a control of flow rate of the refrigerant, the mass flow rate is changed while the volume flow rate is kept constant, whereby a good response to the heat load change may be obtained without changing other control parameters such as pressure ratio or temperature. In the flow rate control of the refrigerant, reduction in the adiabatic efficiency of the expander, which may be caused in the conventional rotational speed control, may be avoided, whereby it is possible to avoid decline in the coefficient of performance.

Further, the buffer tank 111 is provided between the low pressure line 109 and the high pressure line 110 where a pressure difference exists. Accordingly, by opening or closing the first valve 112 provided on the high pressure line 110, it is possible to introduce the refrigerant into the buffer tank 111 according to the pressure difference between the buffer tank 111 and the high pressure line 110. On the other hand, by opening or closing the second valve 113 provided on the low pressure line 109, it is possible to discharge the refrigerant from the buffer tank 111 according to the pressure difference between the buffer tank 111 and the low pressure line 109. Accordingly, through the flow rate control using the buffer tank 111, which does not require power supply from outside, excellent energy efficiency can be obtained.

In particular, the buffer tank 111 is provided between the high pressure line 110, to which the refrigerant is discharged from the compressor 102c disposed at the lowermost stream position among the compressors, and the low pressure line 109, through which the refrigerant is supplied to the compressor 102a disposed at the uppermost stream position among the compressors, whereby a large pressure difference between the high pressure line and the low pressure line can be ensured. Accordingly, by opening/closing control of the first valve 112 and the second valve 113, it is possible to easily carry out the flow rate control through introduction or discharge of the refrigerant from the buffer tank 111.

Further, the high pressure line 110 to which the buffer tank 111 is connected has a branching line branched from a position between the compressor 102c and the cold heat recovering heat exchanger 106. Accordingly, by using cold heat remaining in the refrigerant after cooling the object to be cooled by the cooling part 105, it is possible to precool the refrigerant having a high temperature to be supplied to the expander 104 to improve the refrigerating capacity. In the case where the refrigerant is introduced into the buffer tank 111 to carry out the flow rate control, by introducing the refrigerant into the buffer tank 111 from a branch from the upper stream side of the cold heat recovering heat exchanger 106, the flow rate of the refrigerant supplied to the cooling part 105 is decreased, whereby it is possible to cool the refrigerant by the cold heat recovering heat exchanger 106 more effectively.

Again in FIG. 1, in the refrigerating apparatus 100 of the example, a bypass line 114 is provided between the high pressure line 110 and the low pressure line 109 so as to bypass the buffer tank 111, and on the bypass line 114, a third valve 115 is provided. By switching the state of the third valve 115 to being opened at the time of the starting of the refrigerating apparatus 100 on the basis of a control signal from the controller 200, it becomes possible to operate the compressors 102 or the expander 104 at a high rotational speed to carry out precool, thereby to carry out smooth cooling.

Such operation at a high rotational speed at start-up may be carried out within an acceptable range of cooling rate of e.g. the heat exchangers used in the refrigerating apparatus 100.

In the circulation path 101, since the smallest cross-section is present in the flow path in the vicinity of the inlet of the expander 104, where the density is the highest under the rated operating condition, the intake temperature of the expander 104 is likely to be high (the density of the refrigerant is likely to be small) at the time of precooling. Then, since the flow rate of refrigerant at the place is decreased, in case where the rotational speed is increased in such a state, surging may occur.

Accordingly, in the refrigerating apparatus of the example, in a case where a state indicating a high possibility of surging is detected, the third valve 115 is controlled to be opened to allow the refrigerant to escape from the high pressure line 110 to the low pressure line 109 (bypassing the buffer tank 111), whereby it is possible to maintain the flow rate of the refrigerant to prevent surging of the compressors 102 at the time of precooling. The above valve control may, for example, as follows: a second temperature sensor 180 is provided in the vicinity of the expander 104, and when it is determined on the basis of the detected value of the temperature sensor 180 by the controller 200 that the possibility of surging is high, the third valve 115 is automatically opened.

Since the third valve 115 also requires control of the opening degree by the controller 200, an electric-operated valve is preferably used as the third valve 115.

Further a second bypass line 116 is provided so as to be branched from the position between the compressor 102b and the compressor 102c on the circulation path 101, and a fourth valve 117 is provided on the second bypass line 116. If any of the compressors 102 is stopped due to a failure of the rotating machines including the compressors 102 and the expander 104 or of the control system including an inverter (not shown) for supplying power to the rotating machines, the flow rate of the refrigerant flowing in the Brayton cycle is decreased, and surging may occur also in another one of the compressors 102. In such a case, by opening the fourth valve 117 by the controller 200, it is possible to release the refrigerant to the buffer tank 111 to prevent surging. The above opening/closing control of the fourth valve 117 may, for example, be as follows: rotational speed of the compressors 102 or the expander 104, or output of the control system including the inverter is monitored to detect surging by a sensor (not shown) in the controller, and when a decline in the rotational speed or an error signal is detected, it is determined that surging has occurred, and the fourth valve 117 is opened.

As the fourth valve 117 is required to respond quickly to the open command from the controller 200, a solenoid valve is preferably used as the fourth valve 117. Further, a solenoid valve 118 may be provided between the high pressure line 110 and the buffer tank 111, and it may be configured to be opened or closed on the basis of the control signal from the controller 200 so as to allow the refrigerant flowing in the high pressure line 110 to escape to the buffer tank 111 in case of any abnormality.

The above first to fourth valves may be configured to be opened or closed by control to allow the refrigerant flowing in the circulation path 101 to the buffer tank 111 in case of emergency such as occurrence of some abnormality in the refrigerating apparatus 100, for example. It is thereby possible to avoid an unintended increase in the pressure of the refrigerant in the circulation path 101 or surging in the compressors 102, and thus it is possible to obtain the refrigerating apparatus 100 excellent in safety. In such a case, the flow rate of the refrigerant or the pressure ratio may be monitored by a sensor to control the opening degrees of the valves.

If surging is intended to be avoided only by rotational speed control, a non-step control of rotational speed is said to be preferred. However, there is a problem such that the structure of the apparatus may become complicated in order to carry out such a non-step control. With the refrigerating apparatus 100 of the example, surging can be avoided by flow rate control of the refrigerant, whereby it is possible to improve the safety while the structure of the apparatus is simplified.

The buffer tank 111 may also be used for absorbing change in volume of the refrigerant in the cycle when the refrigerating apparatus 100 is stopped. Although there may be a known refrigerating apparatus employing a tank having such a usage, the above flow rate control of the refrigerant using the buffer tank 11 of the present invention can be carried out by using a conventionally-used tank in combination. Accordingly, the refrigerating apparatus of the present invention also has an advantage in terms of cost.

Further, as the refrigerating apparatus 100 of the example can function by opening/closing control of the valves, deterioration of the parts due to e.g. wearing is less likely to occur. Accordingly, the life of the apparatus is long, and it is possible to ensure durability, reliability and soundness for a long period of time. Further, the opening/closing operation of the valves are easily carried out even in a very low temperature state, whereby it is possible to apply such a refrigerating apparatus 100 to a system used under a sever temperature environment, such as a superconducting device.

In the compression process of the Brayton cycle, an adiabatic compression is carried out; however, the present invention may be applied also to so-called Ericsson cycle, where the adiabatic compression is replaced by a isothermal compression. In the above example, compression heating by the compressors 102 and cooling by the heat exchangers 103 are repeatedly carried out in multiple stages, and by increasing the number of repetition, it is possible to substantially realize an isothermal compression. Accordingly, a refrigerating apparatus which can be regarded as a substantial Ericsson cycle type refrigerating apparatus, which may obtained by increasing the number of stages of compression of the Brayton cycle type refrigerating apparatus of the above example, is also within the scope of the present invention.

In the above description, an example of the refrigerating apparatus using a Brayton cycle is described; however, the present invention can be applied also to a heat pump apparatus using a Brayton cycle.

INDUSTRIAL APPLICABILITY

The present invention is applicable to a Brayton cycle type refrigerating apparatus capable of controlling cooling capacity against change in heat load of the object to be cooled.

The invention claimed is:

1. A Brayton cycle type refrigerating apparatus utilizing a Brayton cycle having multiple stages of compressors arranged in series on a refrigerant line for generating cool heat by using a refrigerant compressed by the compressors to cool a secondary refrigerant, comprising:
   a heat load detecting device for detecting a heat load of an object to be cooled;
   a buffer tank provided between a low pressure line in which the refrigerant before being compressed by the compressors flows and a high pressure line in which the refrigerant after being compressed by the compressors flows;
   a first valve provided on an inlet side of the buffer tank and capable of controlling an inflow rate of the refrigerant into the buffer tank;
   a second valve provided on an outlet side of the buffer tank and capable of controlling an outflow rate of the refrigerant from the buffer tank; and
   a control device for controlling an opening degree of the first valve and an opening degree of the second valve,
   wherein the control device is configured, when a change in the heat load of the object to be cooled is detected by the heat load detecting device, to adjust the opening degree of the first valve and the opening degree of the second valve to change a flow rate of the refrigerant flowing in the Brayton cycle,
   wherein the Brayton cycle type refrigerating apparatus further comprises a cool heat recovering heat exchanger for exchanging heat between the refrigerant compressed by the compressors and the refrigerant after cooling the object to be cooled, and
   wherein the high pressure line has a branching line branched from a position between at least one of the compressors and the cold heat recovering heat exchanger.

2. The Brayton cycle type refrigerating apparatus according to claim 1,
   wherein the high pressure line is a line to which the refrigerant is discharged from a compressor disposed at a lowermost stream position among the compressors, and
   wherein the low pressure line is a line through which the refrigerant is supplied to a compressor disposed at an uppermost stream position among the compressors.

3. The Brayton cycle type refrigerating apparatus according to claim 1,
   wherein a cooling part of the Brayton cycle is configured to cool, by means of a heat exchanger, the secondary refrigerant circulating through the object to be cooled, and
   wherein the heat load detecting device comprises a temperature sensor provided on a line in which the secondary refrigerant flows.

4. A Brayton cycle type refrigerating apparatus utilizing a Brayton cycle having multiple stages of compressors arranged in series on a refrigerant line for generating cool heat by using a refrigerant compressed by the compressors to cool a secondary refrigerant, comprising:

a heat load detecting device for detecting a heat load of an object to be cooled;

a buffer tank provided between a low pressure line in which the refrigerant before being compressed by the compressors flows and a high pressure line in which the refrigerant after being compressed by the compressors flows;

a first valve provided on an inlet side of the buffer tank and capable of controlling an inflow rate of the refrigerant into the buffer tank;

a second valve provided on an outlet side of the buffer tank and capable of controlling an outflow rate of the refrigerant from the buffer tank; and a control device for controlling an opening degree of the first valve and an opening degree of the second valve, wherein the control device is configured, when a change in the heat load of the object to be cooled is detected by the heat load detecting device, to adjust the opening degree of the first valve and the opening degree of the second valve to change a flow rate of the refrigerant flowing in the Brayton cycle, wherein the control device is configured to, when a change rate of the heat load detected by the heat load detecting device is greater than a preliminarily set prescribed value, control a rotational speed of at least one of the compressors and a rotational speed of an expander, and then to adjust the opening degree of the first valve and the opening degree of the second valve.

5. The A Brayton cycle type refrigerating apparatus utilizing a Brayton cycle having multiple stages of compressors arranged in series on a refrigerant line for generating cool heat by using a refrigerant compressed by the compressors to cool a secondary refrigerant, comprising:

a heat load detecting device for detecting a heat load of an object to be cooled;

a buffer tank provided between a low pressure line in which the refrigerant before being compressed by the compressors flows and a high pressure line in which the refrigerant after being compressed by the compressors flows;

a first valve provided on an inlet side of the buffer tank and capable of controlling an inflow rate of the refrigerant into the buffer tank;

a second valve provided on an outlet side of the buffer tank and capable of controlling an outflow rate of the refrigerant from the buffer tank; and a control device for controlling an opening degree of the first valve and an opening degree of the second valve, wherein the control device is configured, when a change in the heat load of the object to be cooled is detected by the heat load detecting device, to adjust the opening degree of the first valve and the opening degree of the second valve to change a flow rate of the refrigerant flowing in the Brayton cycle, wherein the multiple stages of compressors comprise a first compressor, a second compressor and a third compressor, arranged in series in this order from an upstream side, wherein the first compressor and the second compressor are connected to an output shaft of a first electric motor, and wherein the third compressor and an expander are connected to an output shaft of a second electric motor.

* * * * *